(12) United States Patent
Malik

(10) Patent No.: US 7,089,286 B1
(45) Date of Patent: Aug. 8, 2006

(54) METHOD AND APPARATUS FOR COMPRESSING ATTACHMENTS TO ELECTRONIC MAIL COMMUNICATIONS FOR TRANSMISSION

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/563,928

(22) Filed: May 4, 2000

(51) Int. Cl.
*G06F 15/16* (2006.01)

(52) U.S. Cl. .................. 709/206; 709/217; 709/238; 709/246; 709/247; 707/10

(58) Field of Classification Search ............... 709/206, 709/227, 246–247, 238, 217; 707/10
See application file for complete search history.

(56) References Cited

U.S. PATENT DOCUMENTS

| | | | | |
|---|---|---|---|---|
| 5,781,901 A * | 7/1998 | Kuzma | ........................ | 709/206 |
| 5,903,723 A * | 5/1999 | Beck et al. | .................. | 709/200 |
| 5,923,846 A * | 7/1999 | Gage et al. | .................. | 709/206 |
| 5,987,504 A * | 11/1999 | Toga | ........................... | 709/206 |
| 6,021,198 A | 2/2000 | Anigbogu et al. | | |
| 6,275,850 B1 * | 8/2001 | Beyda et al. | ............... | 709/206 |
| 6,356,937 B1 * | 3/2002 | Montville et al. | .......... | 709/206 |
| 6,366,949 B1 * | 4/2002 | Hubert | ....................... | 709/206 |
| 6,424,996 B1 * | 7/2002 | Killcommons et al. | ..... | 709/206 |
| 6,438,585 B1 * | 8/2002 | Mousseau et al. | .......... | 709/206 |
| 6,449,658 B1 * | 9/2002 | Lafe et al. | .................. | 709/247 |
| 6,463,463 B1 * | 10/2002 | Godfrey et al. | ............. | 709/206 |
| 6,501,852 B1 * | 12/2002 | Clark et al. | .................. | 709/202 |
| 6,549,957 B1 * | 4/2003 | Hanson et al. | ................. | 710/5 |
| 6,697,844 B1 * | 2/2004 | Chan et al. | ................. | 709/206 |
| 6,771,382 B1 * | 8/2004 | Misawa et al. | ............ | 358/1.15 |
| 6,842,768 B1 * | 1/2005 | Shaffer et al. | .............. | 709/203 |
| 2002/0131561 A1 * | 9/2002 | Gifford et al. | ............. | 379/67.1 |

(Continued)

FOREIGN PATENT DOCUMENTS

EP 1282300 A2 * 5/2003

OTHER PUBLICATIONS

Online Education Using WebCT: Zip Files in WebCT. Printed from http://www.csus.edu/uccs/webct/faculty/doc/zip.*

(Continued)

*Primary Examiner*—David Wiley
*Assistant Examiner*—Alina Boutah
(74) *Attorney, Agent, or Firm*—Thomas, Kayden, Horstemeyer & Risley, LLP

(57) ABSTRACT

The present invention is directed to a method and system for compressing attachments to electronic mail communications for transmission. In an e-mail communications system, a table stores, for each of a plurality of different types of files, a compressibility value corresponding to a percentage by which the file can be compressed in size. An e-mail attachment configuration module is configured to compress each attachment file of a type having a compressibility value greater than a threshold value in an e-mail communication. In another embodiment, the e-mail attachment configuration module compresses a number of the plurality of attachment files according to file size and the corresponding compressibility value, such that the total size of the e-mail communication after compression is maximized and is less than a threshold size. The attachment configuration module can be incorporated into a system for configuring packages of application files, designated from within user applications, to be sent as e-mail attachments in e-mail communications.

44 Claims, 10 Drawing Sheets

U.S. PATENT DOCUMENTS

2003/0023695 A1* 1/2003 Kobata et al. .............. 709/206
2003/0081252 A1* 5/2003 Silverbrook et al. ....... 358/1.15
2004/0073619 A1* 4/2004 Gilhuly et al. .............. 709/206
2005/0041266 A1* 2/2005 Silverbrook et al. ....... 358/1.15
2005/0044158 A1* 2/2005 Malik ......................... 709/206

OTHER PUBLICATIONS

Shadovitz, Deborah. Mac Efficiency 101: E-mail Attachments. Dec. 1999. Printed from: http://www.macefficiency.com.*

* cited by examiner

Figure 6A

|   | File Name | File Type | Compressibility | Uncompressed | Compressed |
|---|---|---|---|---|---|
| 1. | Engineering Report | Word Processing | 40 | 300 | 180 |
| 2. | Development Costs Spreadsheet | Spreadsheet | 25 | 100 | 75 |
| 3. | Apparatus Picture | Bitmap | 5 | 400 | 380 |
| 4. | Product Picture | Bitmap | 5 | 450 | 427 |
| 5. | Promotion video | Video | 15 | 350 | 298 |

Figure 6B

| Compressed | Uncompressed | Total Size |
|---|---|---|
| 1, 2, 3, 4, 5 |  | 1360 |
| 2, 3, 4, 5 | 1 | 1480 |
| 1, 3, 4, 5 | 2 | 1385 |
| 1, 2, 4, 5 | 3 | 1380 |
| • | • | • |
| • | • | • |
| • | • | • |
| • | • | • |
| 1,, 2 | 3, 4, 5 | 1455 |
| 1, 5 | 2, 3, 4 | 1428 |
| 2, 4, 5 | 1, 3 | 1500 |
| • | • | • |
| • | • | • |
| • | • | • |
| • | • | • |

Figure 9
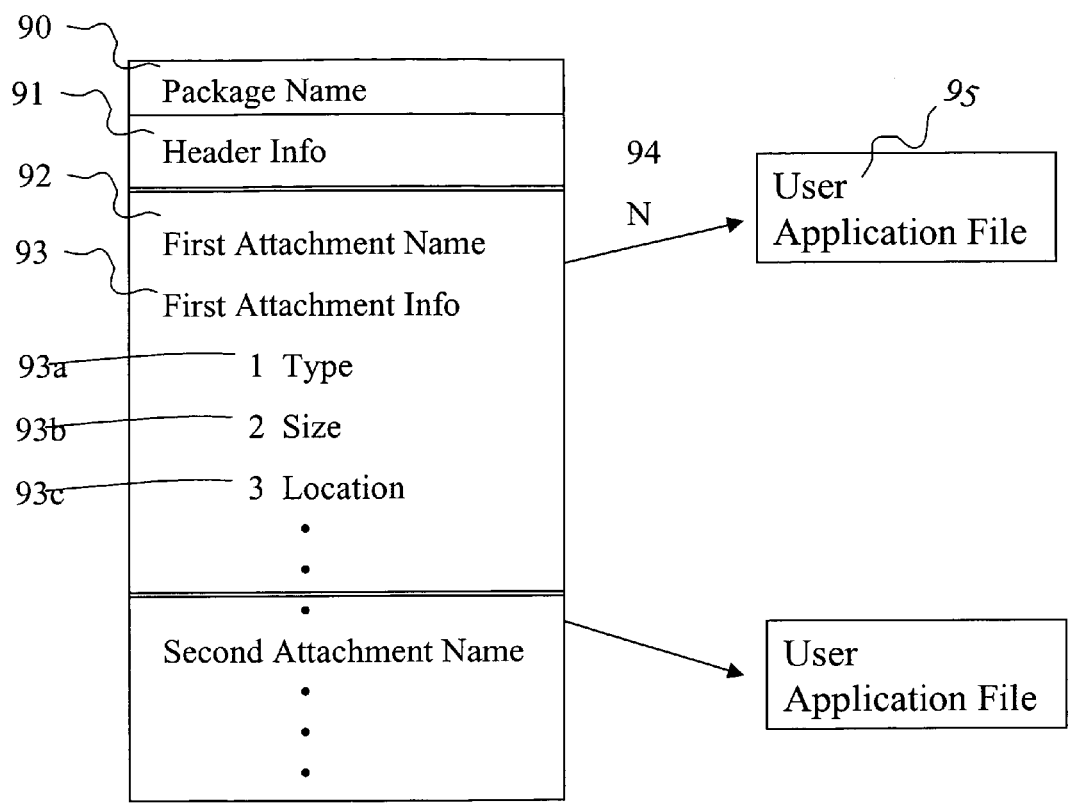
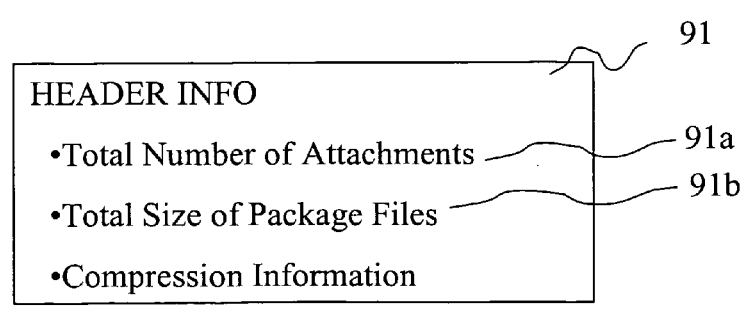

METHOD AND APPARATUS FOR COMPRESSING ATTACHMENTS TO ELECTRONIC MAIL COMMUNICATIONS FOR TRANSMISSION

FIELD OF THE INVENTION

The present invention relates to the transmission of electronic mail over computer networks, and more particularly, to compression of attachment files to electronic mail communications when necessary for transmission, according to the compressibility of the files designated as attachments.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

Most e-mail application programs allow a user to attach a file to be sent along with a message as an "attachment." Attachment files might include word processing documents, graphics files, audio or video, multimedia presentation files, executable programs, spreadsheet reports, etc. A recipient will receive the e-mail message plus any attached files, which may then be opened and accessed through the appropriate application software. In many applications, it is preferable to send documents through e-mail attachments instead of as a facsimile because the recipient can then store, edit, and print an original file. For long-distance communications, it is also less costly to send documents via e-mail as compared with facsimile transmissions.

For many projects, it is appropriate or desirable for a user to send a plurality of attachments to another at one time. The files to be included as attachments may each be of the same type, or may be of a multitude of different types. For example, if a user wished to send a plurality of files via electronic mail about a particular project, the user may attach a written report about the project, a spreadsheet analysis, a multimedia presentation, and a video of a product to be developed by the project. In such a case, each of these files is attached to the same e-mail communication for transmission to a desired recipient.

Although many currently available e-mail application programs enable a user to send attachments as part of an e-mail communication, there are several problems that users often encounter when sending e-mail attachment files. If the total size of the group of attachment files exceeds a preset size limit, a user's e-mail system or a recipient's e-mail system will cancel delivery of the e-mail communication. It is common for a user to receive a "returned e-mail" or an "undeliverable" notification from the user's e-mail system gateway or the gateway from the intended recipient because the attachment files are too large. Network administrators set a size limit for e-mail communications in order to reduce traffic that slows the network. Accordingly, when a sender receives an "undeliverable" message in response to an attempt to transmit a plurality of attachments, the sender must reconfigure the e-mail by guessing which one or combination of the attachment files renders the total size of the e-mail communication unacceptably large. This requires the user to divide the single e-mail communication into multiple e-mails, run separate compression software to compress some or all of the files, or do a combination of the two. The decision as to which files are compressed or omitted from the communication is determined by process-of-elimination, as the sender must repeatedly attempt to send the e-mail until the sender no longer receives an "undeliverable" notification.

There are also other problems associated with sending e-mail communications with multiple attachments. The user may be aware that a series of attachment files need to be included in an e-mail application, but may not remember the names of the files. The user must then perform an extensive search using file management systems in order to locate the appropriate files to be attached. Another frequently encountered problem is that the user might remember to send some, but not all of the attachments that were intended. In some circumstances, this can lead to confusion, or at least embarrassment because the user referred in the sent message to attached files that have not been sent. These problems significantly reduce the benefits of e-mail systems and may negatively affect a user's productivity when engaging in electronic mail communications.

SUMMARY OF THE INVENTION

In view of the difficulties encountered with sending attachments to e-mail communications described above, there is a need for a method and apparatus for assisting a user to properly configure an e-mail communication to include the transmission of desired attachment files.

According to one aspect of the present invention, an e-mail communications system is provided for selectively compressing attachment files to an e-mail communication. The system includes a table storing, for each of a plurality of different types of files, a compressibility value corresponding to a percentage by which the file can be compressed in size. An e-mail attachment configuration module compresses each attachment file of a type having a compressibility value greater than a threshold value in an e-mail communication. The present invention also provides an e-mail attachment configuration module for compressing a number of the plurality of attachment files according to file size and a corresponding compressibility value, such that the total size of the e-mail communication after compression is maximized and is less than a threshold size.

The present invention also provides a method of selectively compressing attachment files to an e-mail communication for transmission along a network. A compressibility value is stored for each of a plurality of different types of files corresponding to a percentage by which the file can be compressed in size. The file type is determined for each attachment file to the e-mail communication. Each attachment file of a type having a compressibility value greater than a threshold value in the e-mail communication is compressed. According to another aspect of the present invention, a number of the plurality of attachment files are compressed according to file size and a corresponding compressibility value, such that the total size of the e-mail communication after compression is maximized and is less than a threshold size.

The present invention for compressing attachment files can also be incorporated into a system for configuring packages of e-mail attachment files for transmission as e-mail communications. The system includes a plurality of data structures, each data structure grouping together a plurality of different user application files designated as attachments to an e-mail communication. A packaging file manager designates user application files from within respective user applications to selected data structures, such that each designated application file is associated with a selected data structure. An e-mail application user interface provides a listing of the data structures containing user application files generated by the packaging file manager during composition of an e-mail communication having attachments. A table stores, for each of a plurality of different types of files, a value corresponding to a percentage by which the file can be compressed in size, and an e-mail attachment configuration module compresses each attachment file in a selected data structure of a type having a compressibility value greater than a threshold value in an e-mail communication.

BRIEF DESCRIPTION OF THE DRAWINGS

FIG. 6A is a table of files with corresponding compressed and uncompressed file sizes, according to a preferred embodiment of the present invention.

FIG. 6B is a table of combinations of compressed and uncompressed files provided in FIG. 6A, with the corresponding total size, according to a preferred embodiment of the present invention.

FIG. 9 is a schematic diagram illustrating a data structure for a package according to an embodiment of the present invention.

DETAILED DESCRIPTION OF PREFERRED EMBODIMENTS OF THE INVENTION

Figure 1:
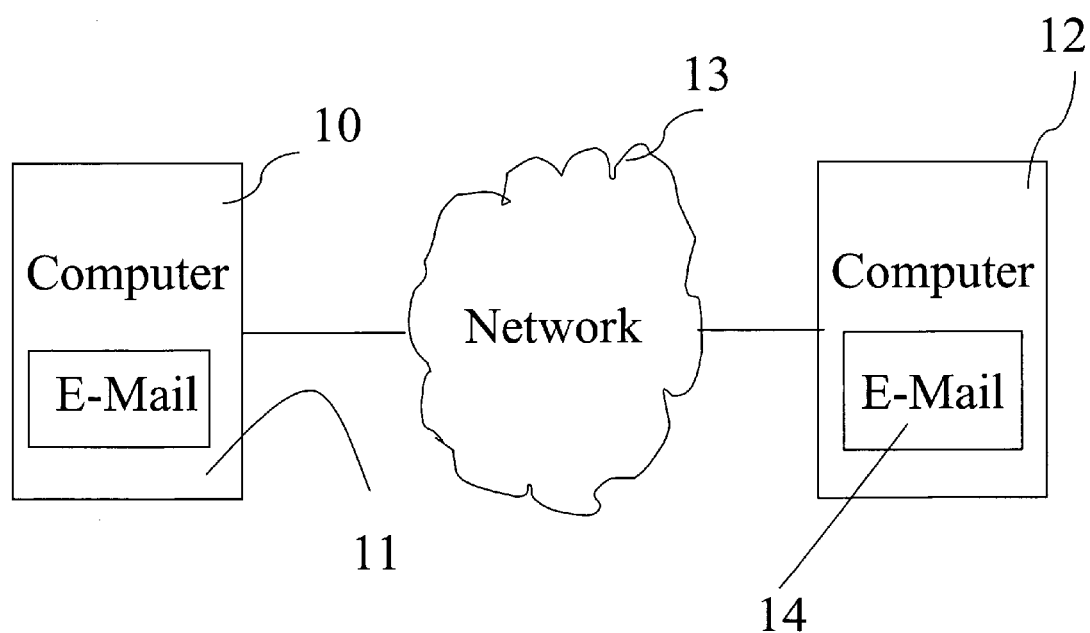
FIG. 1 is a schematic diagram of a basic computer network system.

The present invention will now be described in more detail with reference to the figures. FIG. 1 is a schematic diagram of a basic computer network system, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LAN or WAN, the world wide web, or any combination thereof. Computers 10 and 12 may be the only computers connected to the network 13, or the network may be shared by many other computers.

Figure 2:
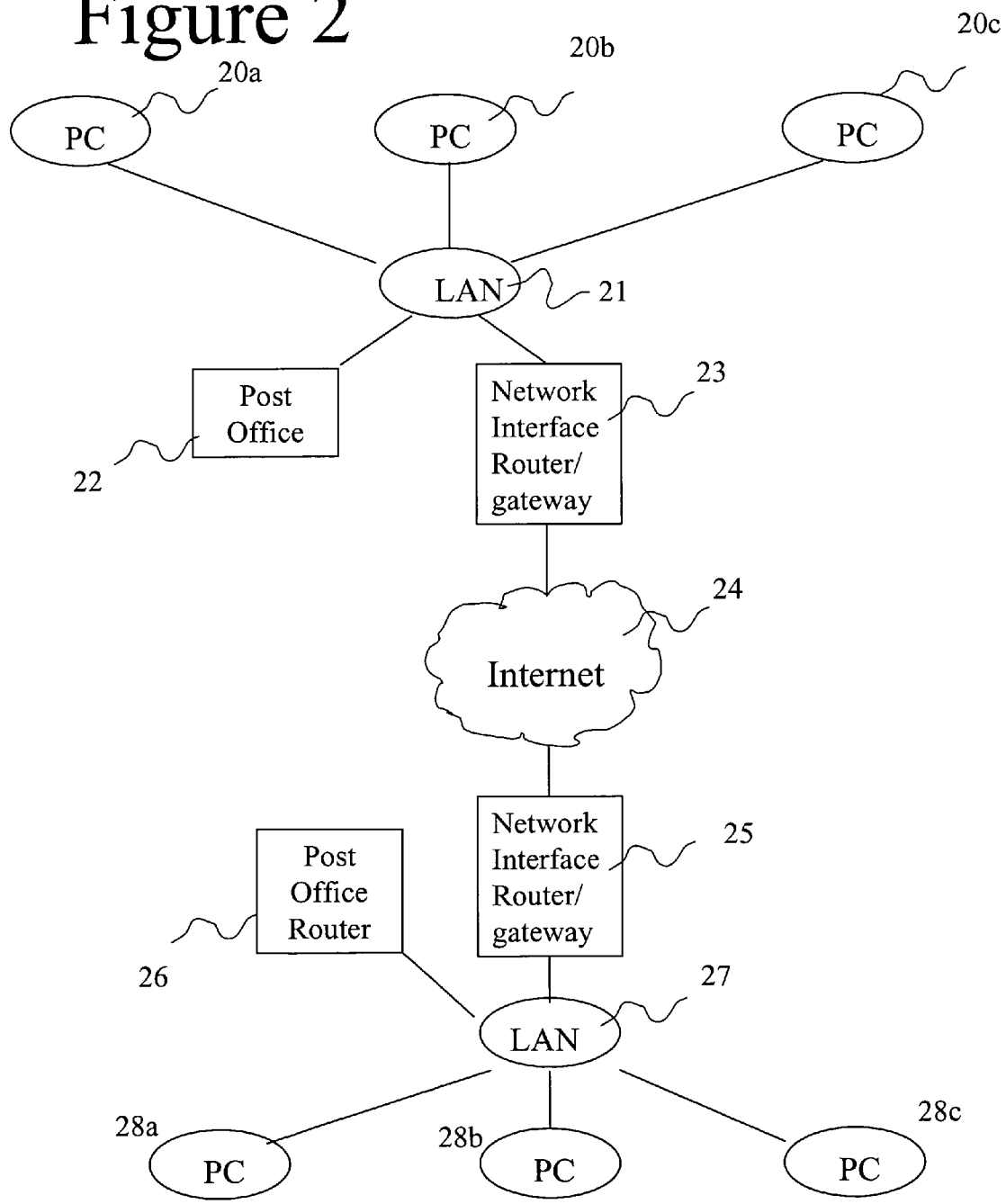
FIG. 2 is a schematic diagram of a networked computer system connected to the Internet according to an embodiment of the present invention.

FIG. 2 is a schematic diagram of a specific networked computer system in accordance with a preferred embodiment of the present invention, wherein an e-mail communication with an attachment is transmitted from computer 20a to computer 28c via the Internet 24. Computers 20a, 20b, and 20c are connected together via LAN 21. Post office server 22 connects to LAN 21 for transmitting e-mail both within and outside the LAN network. A world wide web hyper text transport protocol ("HTTP") server 23 ("web server") is also connected to the LAN 21 for facilitating communication between any of the computers 20a, 20b, and 20c with other computer systems via the internet 24. Likewise, computers 28a, 28b, and 28c are connected together through LAN 27, which is also connected to a post office server 26 and web server 25.

When a user stationed at computer 20a sends an e-mail communication having a message and one or more attachment files, an e-mail application program running on computer 20a performs initial formatting and then forwards the communication to the LAN 21 for transmission. The LAN receives the communication and forwards it to post office server 22. Post office server 22 first determines whether the e-mail is a local communication within the LAN network. If so, the LAN 21 sends a notification message to the computer within the network that corresponds with the destination address. When a user at that computer elects to read the e-mail communication, the LAN 21 then forwards the e-mail communication directly to the destination computer.

If post office server 22 determines that the e-mail communication is to be sent outside of LAN 21, such as to computer 28c, the e-mail communication is forwarded to network router 23. The router 23 first re-formats the files in the e-mail communication for transmission along the internet, in formats such as MIME or UUENCODE. The files are then transmitted from the gateway associated with LAN 21 to an internet service provider (ISP). The e-mail communication is routed through a network toward an ISP for router 25 associated with LAN 27. The e-mail communication is then forwarded to the post office server 26 for LAN 27. Post office server 26 generates a notification message for computer 28c. When the user elects to review the e-mail communication, it is transmitted along the LAN 27 to the destination computer.

If the e-mail communication described with respect to FIG. 2 contains one or more large attachments, it is possible that either LAN 21 or LAN 27 will not allow the transmission of the e-mail communication in its standard format because of size constraints. However, compression of one or more of the attachment files may sufficiently reduce the size of the e-mail communication below the limits imposed by the LANs. The present invention provides a system for selectively compressing attachment files, according to the compressibility of the file types, to facilitate the transmission of e-mail communications. Only the minimum number of files are compressed as required for transmission. By compressing a subset of the attached files, the system transmits the e-mail communication without unnecessarily dividing the e-mail into separate e-mails, which would create delays. Further, by only compressing the files necessary to effect transmission, the recipient does not have to wait to decompress files that did not need to be compressed.

Accordingly, the selective compression of attachment files maximizes the speed and efficiency of e-mail communications. The attachment files can be compressed by any of several known compression applications, using known algorithms, including PKZIP. The system can also use different compression applications according to the type of file to be compressed.

The system for automatically compressing attachment files in e-mail communications is now explained with reference to the e-mail communications system 30 in FIG. 3. E-mail interface 31 provides a user interface for composing e-mail communications. Files that are selected to be attachments are stored in memory 35$a$, and are linked to the e-mail interface through data structures stored in 35$b$. Compressibility table 34 provides a database of a plurality of different types of files and the degree of compressibility for each respective type of file. Examples of file types might include word processing files, CAD files, video files, presentation software application files, picture files, etc. The compressibility of each of the different types of files is preferably provided in table 34 as a percentage by which the corresponding file is typically reduced in size after compression. The compressibility table 34 is connected to an e-mail attachment configurator module 33 for determining which of the attachment files are to be compressed. Compression module 36 performs the compression of the attachment files selected to be compressed. The compression files are stored in memory 35$b$. Once the e-mail communication is configured for transmission, e-mail interface 31 forwards the e-mail message and attachment files to network interface 32.

The method of selectively compressing attachment files according to the preferred embodiment is described with reference to FIG. 4. A user composes an e-mail communication having one or more attachments. Once the user requests to transmit the e-mail communication, as in step 40, the system determines the file type for each attachment file designated with the e-mail communication, as in step 41. Information regarding the compressibility of one of the designated attachment files is loaded in step 42 into the e-mail attachment configurator module 33 of FIG. 3. The system checks if the compressibility of that file type is above a certain threshold, in step 43. If it is, the file is then compressed in step 44. The process of loading compression information and selectively compressing files continues until each file has been analyzed. When the system determines that no other files remain to be analyzed, in step 45, the e-mail communication is transmitted, in step 46.

The threshold according to which the system decides whether to compress a file can be automatically calculated, predetermined, or user-selected. An automatically calculated system changes the threshold point according to the relative amount of traffic on the network. The threshold point is used in step 43 of FIG. 4 for determining whether an attachment file is to be compressed. For example, in the late evening, when a LAN for a business is generally underutilized, the threshold for compressing files can be set to be relatively large such that few files are compressed. This allows for faster transmission because the system compresses comparatively fewer files before transmission. The recipient of the e-mail communication will also have the benefit that fewer files need to be decompressed. In contrast, during the peak hours on the network, the compression threshold is lowered, such that a majority of the attachment files are compressed before transmission along the network. This reduces the number of packets sent along the network during busy time periods, thus allowing for more efficient usage. A detector connected to the network server (not shown in FIG. 3) detects the relative network traffic, and sends a signal regarding the traffic information to network interface 32 in FIG. 3. The detector determines the relative amount of traffic on the network by a number of known methods. This information is then provided to the e-mail attachment configuration module 33 from network interface 32

A predetermined system can be configured to compress those files that are capable of noticeable compression. It can additionally include time-of-day features, in which the compression threshold, used in step 43 of FIG. 4, varies according to the time. For example, it is commonly known that a LAN for a typical business is busiest during the mid-morning, the time period immediately after lunch, and the time period immediately before 5:00 pm. The compression threshold can be adjusted to accomodate for higher network traffic during the peak times. During peak times, the compression threshold is lowered, such that most files that are capable of noticeable compression will be compressed. In this manner, users who do not wish to transmit compressed files in an e-mail communication will be encouraged to send bulky e-mail communications during off-peak hours.

Figure 4:
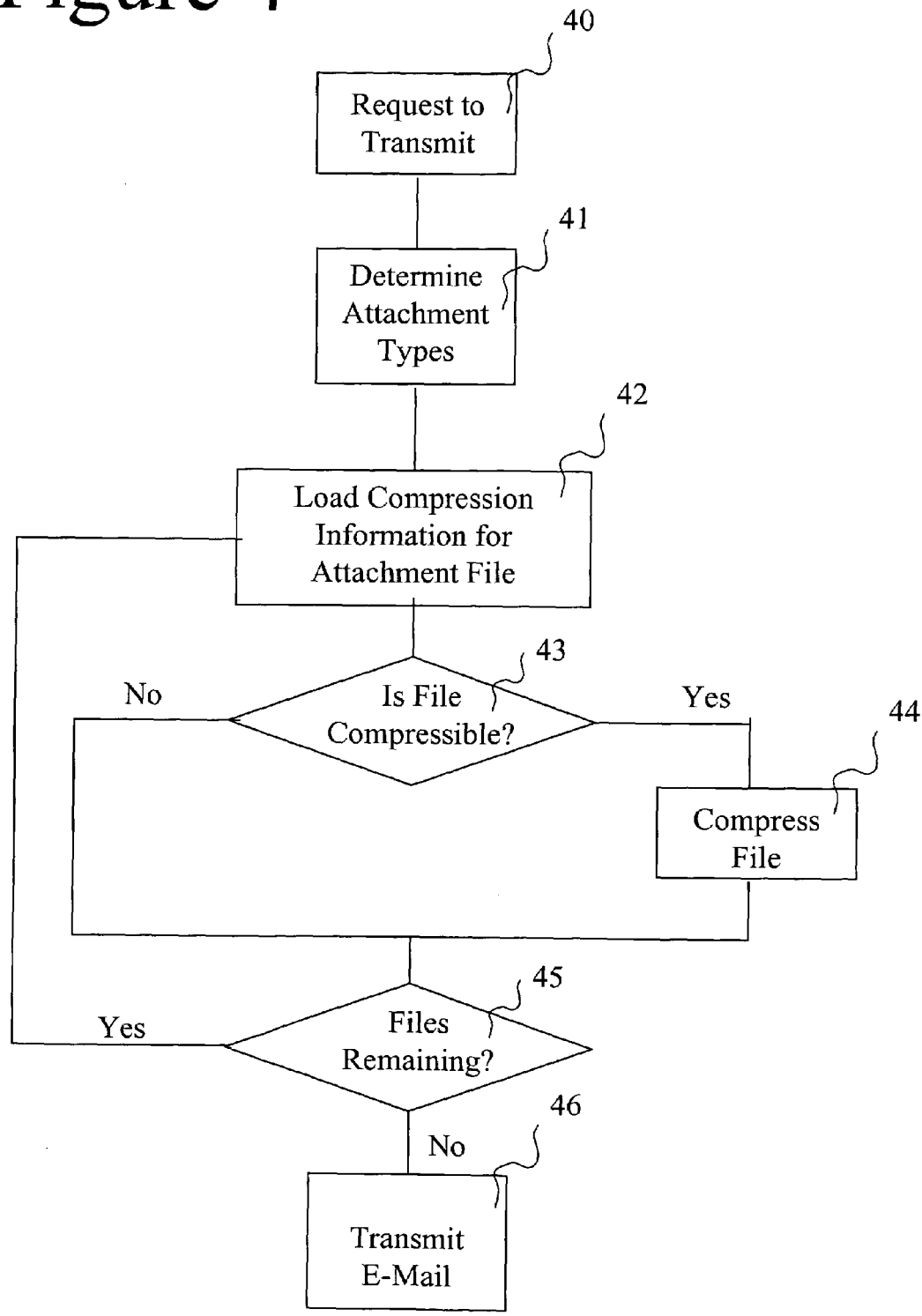
FIG. 4 is a flow diagram of steps for selectively compressing attachment files according to a preferred embodiment of the present invention

Alternatively, a user can select the compression threshold used in step 43 of FIG. 4 based upon the user's knowledge of the number of files that are to be attached, or the relative priority of the message. As an example of a user-selected compression threshold, the e-mail application may be configured to provide a "compressibility selector" with a "high, medium, or low" selection. Continuing further, the "medium" selection, for example, could be programmed to require compression of all file types that can be compressed by 15% or more. If the user is aware that the e-mail communication includes a large number of files, the user will likely opt for a low compression threshold to avoid a delivery failure. However, if the user is only sending a single attachment file in an urgent e-mail, he may opt for a high compression threshold, even if the file type is very compressible, in order to avoid delays resulting from compression and decompression.

Figure 3:
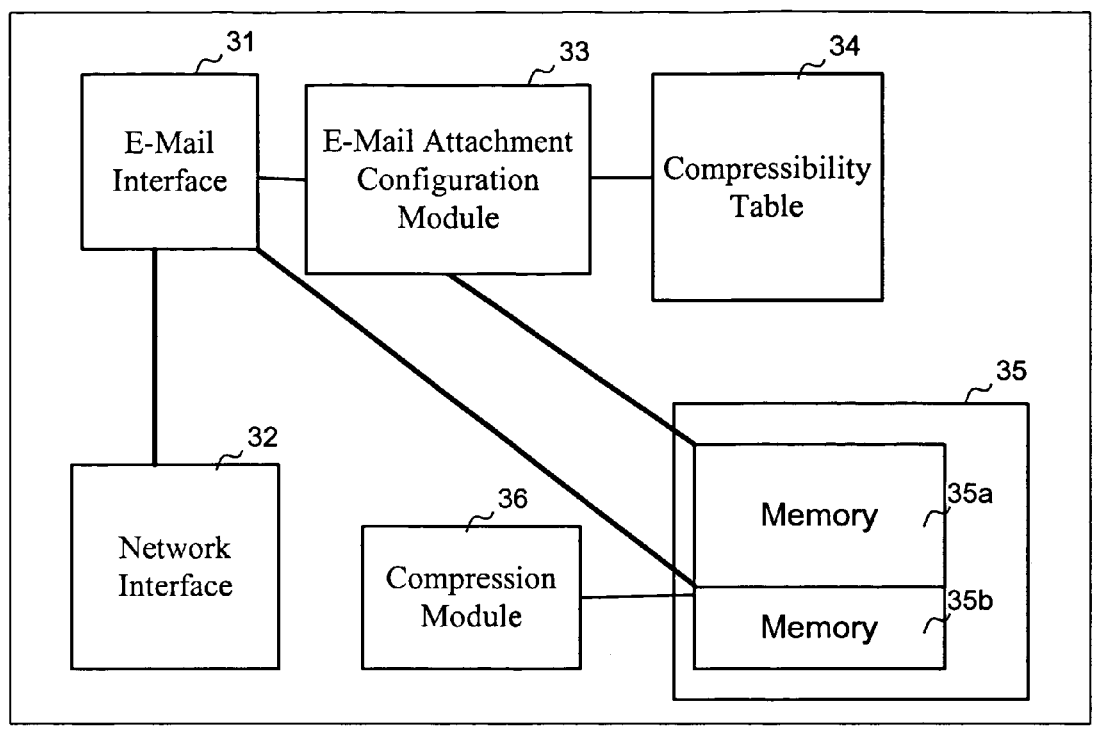
FIG. 3 is a schematic diagram of an e-mail communications system according to an embodiment of the present invention.

In a second embodiment, the e-mail attachment configuration module 33 in FIG. 3 determines an optimal configuration for transmitting a group of attachments according to a size limit determined at the network level. A method for determining the optimal configuration is now described with reference to FIG. 5. Once a user requests to transmit an e-mail communication, in step 50, the e-mail communications system determines each of the file types for the files designated as attachments, in step 51. The compressibility of each of the attached files is determined in step 52, by reference to the compressibility table 34 in FIG. 3. In the alternative, the system compresses each of the files to compare, for each file, the compressed and uncompressed sizes. In step 53, the attachment configuration module 33 in FIG. 3 loads the size limit, as determined by the network, via network interface 32. The size limit may be a fixed, predetermined number, an automatically calculated number, or a user-specified number, each of which operate in the same manner as the compression threshold described above in the first embodiment and explained in further detail below.

Once information is known regarding the compressibility of each attachment file, the size of each attachment file when uncompressed, and the size limit for the network, the e-mail attachment configuration module can determine the optimal configuration for the e-mail, as in step 54. The module may calculate, based upon file type, the size of each file designated as an attachment when compressed. The module devises every possible combination of compressed and uncompressed attachment files, and calculates the resulting total size of the e-mail communication. The combination of compressed and uncompressed files that is at the size limit, or under the size limit by the minimum amount, is then selected for transmission.

An example of a calculation for the optimal configuration for transmission of a group of e-mail attachments is provided with reference to the tables in FIGS. 6A and 6B. In this example, there are five different files that are designated to be attached to an e-mail communication. Each file is identified in FIG. 6A by type, for which compressibility (by percentage) is provided from a compressibility table. The uncompressed size of the file (in kilobytes) is detected, from which the size of the file (in kilobytes) when compressed is calculated. In the alternative, where each file is compressed to evaluate compressibility, a compressibility percentage is not utilized. FIG. 6B shows a portion of the possible combinations of compressed and uncompressed files, and the total file size (in kilobytes) for each combination. As can be seen in this example, if the size limit is 1.5 megabytes, the optimal combination is that in which files 2, 4, and 5 are compressed, and files 1 and 3 remain uncompressed.

As referred to above, the e-mail size limit standard can be determined by the network, predetermined within the e-mail application, or specified by the user. When automatically calculated by the network, a size limit will be supplied through the network interface 32 in FIG. 3 periodically throughout the day according to the traffic along the network. For example, the network administrator may set the limits for the maximum e-mail size at 2.0 MB when the network is at 50% capacity, 1.5 MB when the network is at 75% capacity, and 1.0 MB when the network is at 95% capacity. There can be as many intervals as necessary to improve performance along the network. The capacity of the network is determined and supplied to the configuration module via the network interface. The network information relevant to the user's e-mail may concern the network traffic on the entire LAN, or just the traffic on the portion of the LAN the extends from the user's computer to the post office on the LAN.

At the present time, it is common for network administrators to set the network at one size limit for e-mail communications. Accordingly, if the network is set to only allow e-mail communications of, for example, 1 MB or less, the e-mail configurator module can be preset with a predetermined size threshold, to only allow files smaller than 1 MB.

The e-mail configurator module can also allow for a user-specified file size limit as an alternative to the automatically calculated limit or the predetermined limit. For example, if the sender knows that the recipient's LAN will not accept e-mail communications greater than 0.75 MB (which may be lower than the automatically calculated or predetermined limits) the sender may wish to specify this limit for calculating the optimal configuration. This will also be helpful for the sender if, despite the automatic calculation or predetermined size limit, the e-mail communication is returned by the recipient's network as being undeliverable. A user-specified option provides an override to allow the user to provide the size limits necessary for delivery.

Depending upon the configuration of the recipient's e-mail communications system, the sender's e-mail configurator module can include additional capability to compress files according to the size limits imposed by the recipient's LAN. In e-mail communication systems that are generally available in the prior art, a user will receive an "undeliverable mail" message in response to an e-mail, if the size of the group of attachments in the e-mail exceeds a predetermined size limit. The "undeliverable" message typically does indicate the size limit for the recipient's LAN. The present invention provides an automatic reconfiguration and resending of a mis-sent message in response to an "undeliverable message" that indicates the size limit for the recipient's LAN. The e-mail communications system according to this embodiment additionally includes in the e-mail configuration module 33 of FIG. 3 a detector for detecting the receipt of a "undeliverable" notification. The subject heading of the "undeliverable" notification provides the size limit for the recipient's LAN. The sent e-mail is retrieved and reconfigured according to steps 51–56 in FIG. 5. In this application, the "E-Mail Size Limit Standards" is provided from the subject heading of the "undeliverable" notification message. This reconfiguration and resend feature can occur automatically, or the user interface 31 in FIG. 3 may prompt the user to authorize re-transmitting the e-mail communication.

Figure 7:
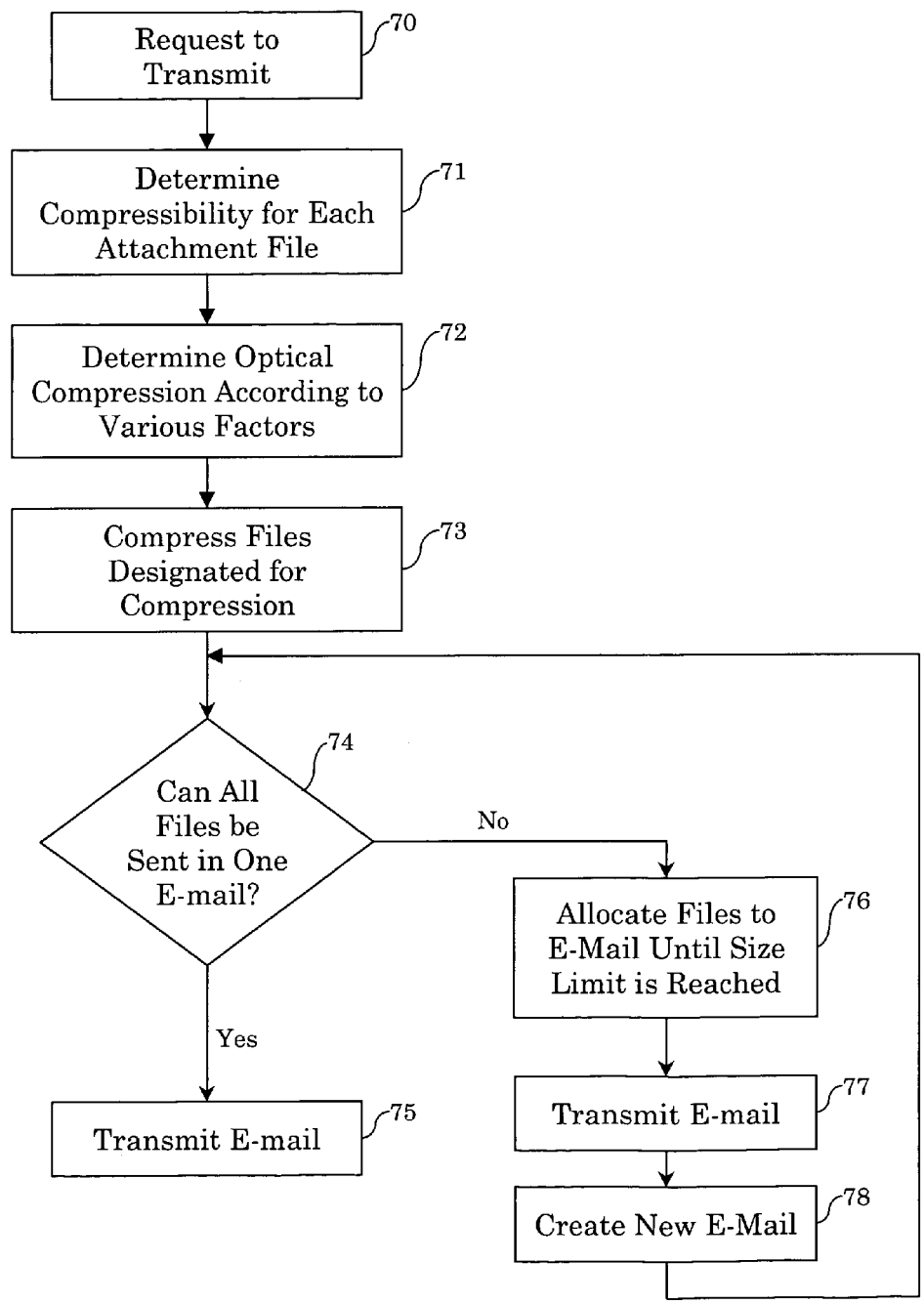
FIG. 7 is a flow diagram of steps for selective compressing attachment files and dividing e-mail communications according to an embodiment of the present invention.

The method described above for compressing attachment files by determining an optimal configuration according to an imposed size limit assumes that all files designated as attachments can be sent in a single e-mail communication. If the size of the collection of attachment files, even after compression, is too large to be transmitted in the same e-mail, the system divides the e-mail communication into multiple e-mails. FIG. 7 provides a flow diagram of the steps for selectively compressing attachments in an e-mail communication and for creating additional e-mails when necessary to ensure proper delivery.

In response to a request to transmit an e-mail communication, in step 70, the system then determines the compressibility of each attachment file, in step 71. This can be performed in accordance with a compressibility table, as described above, or by performing compression of each file. In step 72, the system then determines which files are to be compressed. As described above, the optimal compression for the group of attachment files may be determined according to the compressibility of each of the files, the size limit imposed on the e-mail communication, the urgency of the e-mail communication, the time of day that the e-mail is to be communicated, etc. The system then compresses those files that are designated for compression in step 73.

Based upon the size of the compressed and uncompressed files that are to be transmitted, the system can calculate in step 74 whether all of the files can be sent in a single e-mail communication. If the total size is within the size limitation, then the e-mail is transmitted in step 75. If the size limit is exceeded, the system allocates files to the first e-mail until the total size of the e-mail reaches the size limit, in step 76. This e-mail is transmitted in step 77. A new e-mail is then created in step 78. With the remaining compressed and uncompressed files to be transmitted, the system continues the cycle of checking whether the files can be transmitted in a single e-mail, or whether the files need to again be divided into separate e-mail communications, as shown in steps 74 and 76–78.

When an e-mail that includes one or more compressed files is transmitted, the system can also automatically provide an icon or a URL to a website containing software to decompress those files that are compressed. If the recipient's e-mail software package does not include decompression software to automatically decompress a file attachment, the user can easily access a website and download software to be able to access the attachment file.

Figure 5:
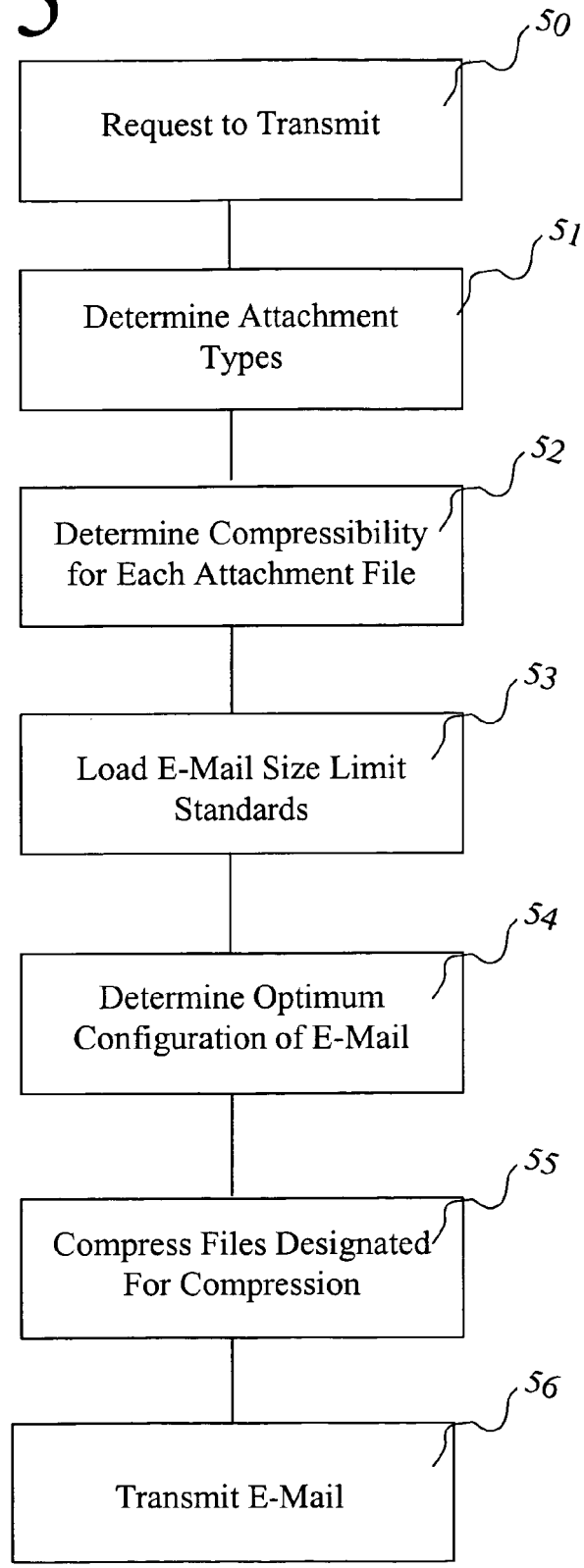
FIG. 5 is a flow diagram of steps for selectively compressing attachment files according to a size limit, according to an embodiment of the present invention.

As shown in FIG. 3, and as described in the flow diagrams provided in FIGS. 5 and 7, the e-mail communications system of the preferred embodiment determines whether files are to be compressed and performs the file compression at the user's workstation that is connected to the network. In an alternative embodiment, the e-mail attachment configuration module, compression module, compressibility table, etc. are provided in the e-mail server itself, and the methods of compressing the attachment files or dividing e-mails into separate e-mail communications as described in FIGS. 5 and 7 are performed by the e-mail server. In this embodiment, all of the attachment files are transmitted within the internal network as uncompressed files. However, the processing of the compression algorithms described in FIGS. 5 and 7 can be centralized in the e-mail server, which may have a faster processing speed.

Although the present invention can be used for configuring any e-mail communication that includes one or more attachment files, it can also be incorporated into a system for configuring groups of application files attached to an e-mail communication as a package. During the time that a user accesses user applications, the user can designate files to be a part of a new or an existing package of application files. The packages of application files, as defined by the user, can then be included as an e-mail attachment in a future e-mail communication. Before sending the e-mail communication, the system can compress the package of files in an optimal arrangement, according to the compressibility of the file types.

Figure 8:
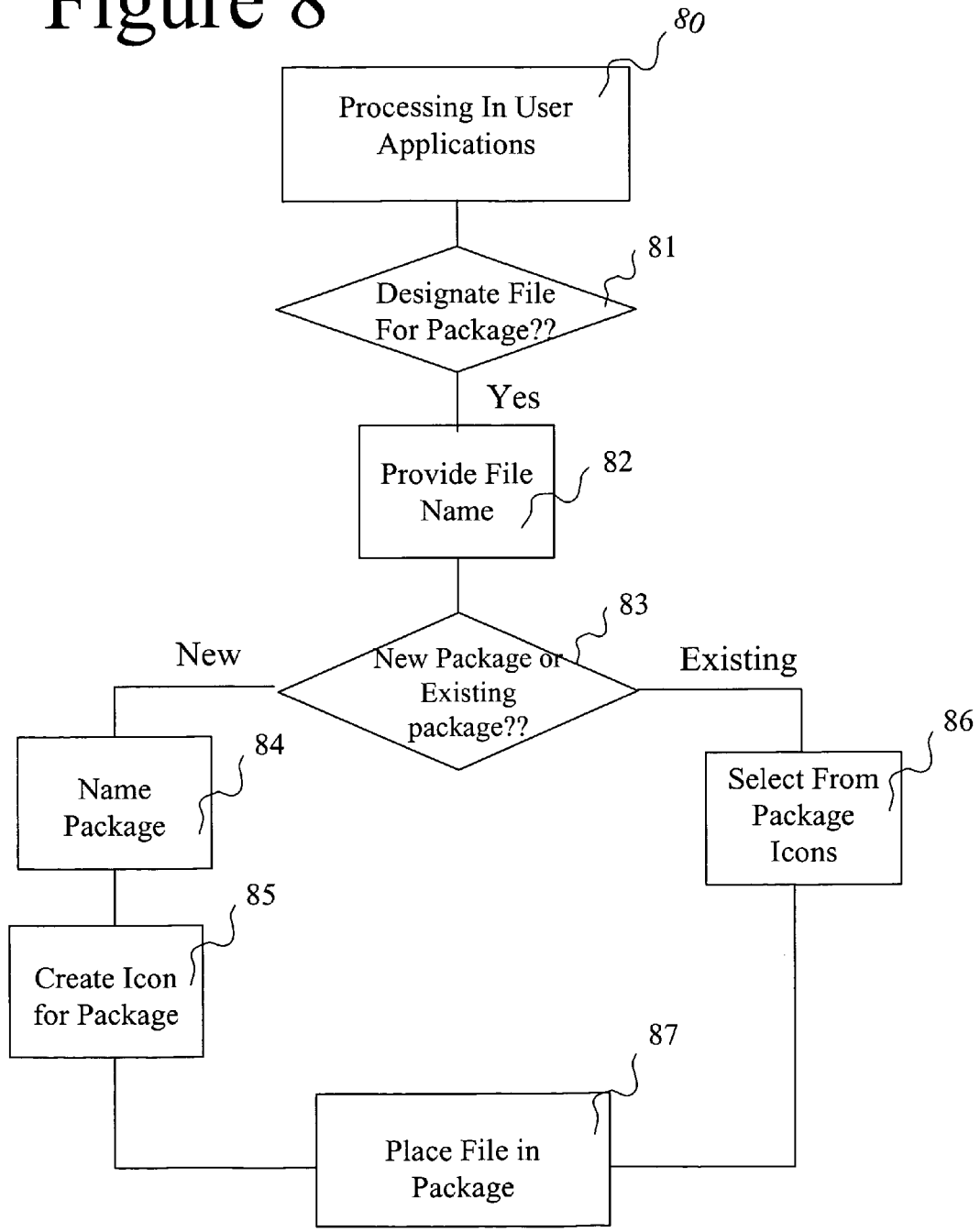
FIG. 8 is a flow diagram providing a method for designating an attachment file into a package according to an embodiment of the present invention.

FIG. 8 provides a flow diagram illustrating how the e-mail application interfaces with a user application to coordinate the composition of packages of designated files for attachments. A user opens a user application, as in step 80, and begins to process an application file in the normal course. In this context, processing may include creating a new file, or opening and editing an existing file. The application files may be in a text format or any graphics, audio/video, or multimedia-type format. Graphics files might include jpeg, tif, or gif files. At any time during processing of the file, the user may choose to designate the application file for a package, as in step 81. This may be done by selecting an icon that is overlaid onto the screen of the user application. Alternatively, the user application itself may incorporate a macro within its menu or in its "toolbar" for creating e-mail attachment packages.

If the user designates the file for an attachment, the user is then prompted to supply a file name, as in step 82. Under most circumstances, the user will wish to maintain the same name as that of the existing file, which can be provided as the default. However, the user may wish to change the name associated with the attachment file, in order to be more convenient or appropriate for the intended recipient of the attachment. For example, the user may name an application file according to an internal billing or reference code, but may choose to rename the designated attachment file as one that the recipient will recognize.

The user is then prompted to select an appropriate package for the designated file, in step 83. As one option, the user may choose to create a new package. If so, the system prompts the user to identify a package name, step 84, and creates an icon that is to be associated with the package, in step 85. If the user wishes to add the attachment file to an existing package, the system prompts the user to select from a list of packages, by name or by icon, or to provide the desired package name, in step 86. In step 87, the user application file is then designated as an attachment for a particularly defined package.

In accordance with one embodiment, a pointer or link 94 is then associated between the application file and a data structure for the package, as illustrated in FIG. 9. The data structure contains the package name 90 defined to identify the package. The header information 91 stores information about the package itself, which may include the number of attachment files currently associated with the package 91*a*, the total size of the combination of attachment files 91*b*, and information regarding the capabilities for compressing the file. For each file designated as an attachment and associated with the package, the data structure includes the user-defined attachment name 92 (which may differ from the user application file name) and general attachment file information 93, including the file type 93*a*, file size 93*b*, file location 93*c*, etc. A pointer or link from the attachment information 93 to the user application file 95 is maintained.

Figure 10:
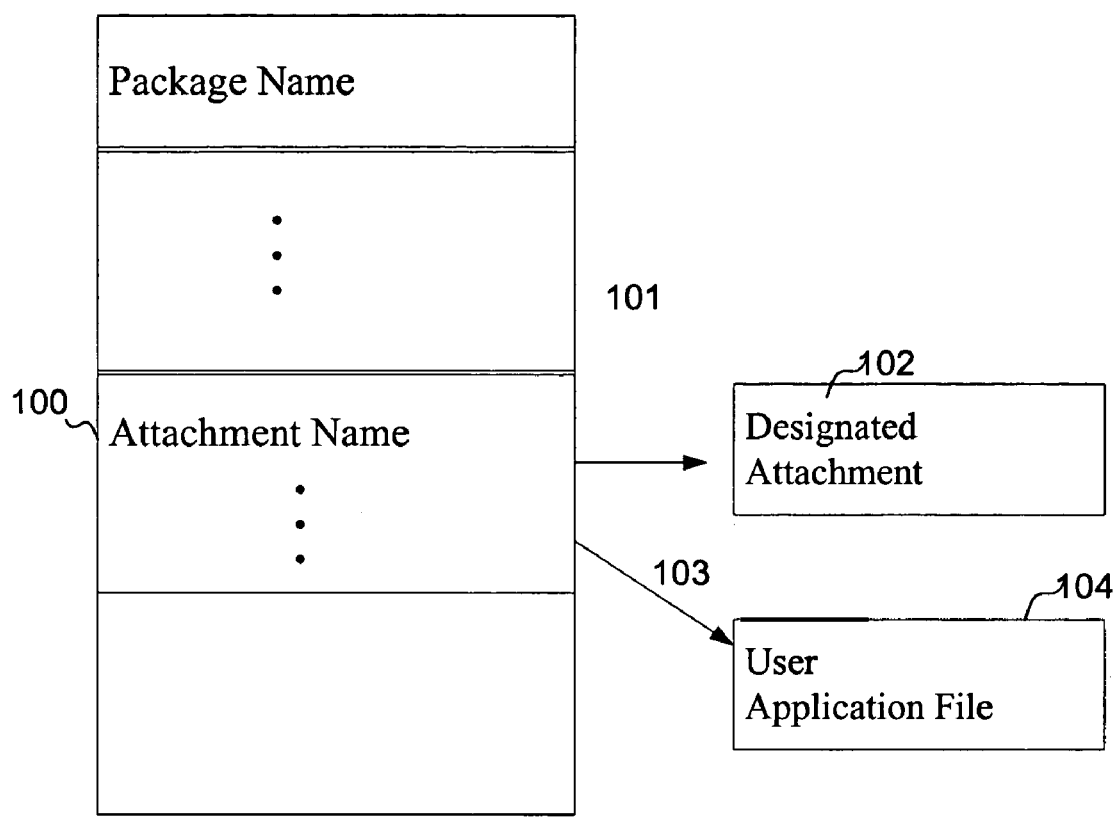
FIG. 10 is a schematic diagram illustrating a data structure for a package according to an alternative embodiment of the present invention.

In an alternative embodiment, a copy of the user application file is made and stored as a separate file. In this data structure, as shown in FIG. 10, the attachment information portion 100 maintains a link or pointer 101 to a new copy of the user application file, stored as designated attachment 102. In this embodiment, when a user application file is designated as an attachment, a copy is made of the user application file in its current form. Any subsequent edits to the user application after the user designates the file in a package are not automatically incorporated into the attachment file. However, because the user may desire to transmit the latest version of the user application, a second pointer is also maintained 103 to the user application file 104. When the user enters the e-mail application and requests to include a particular package as an attachment, the system can detect whether the user application file 104 has changed from the designated attachment 102, and the user can choose which file to include in the package. Although it is more cumbersome to store a separate copy of the user application file to be attached, this embodiment provides additional functionality for the user.

The attachments are compressed after the user elects to send one of the packages along the network. Within the e-mail application, the user can select a package and elect to "close the package." According to the first embodiment, the e-mail attachment configurator module 33 of FIG. 3 checks if the compressibility of each file type is above a certain threshold, and then selectively compresses those files. According to the second embodiment, the configurator compresses the optimal number of attachment files in the package in order to reduce the size of the package below the e-mail size limit determined by the LAN(s).

As can be readily seen, the e-mail configuration module and the system and method for compressing attachments to electronic mail communications for transmission provides several advantages to the sender for composing and transmitting e-mail communications. The system allows for the most efficient use of the sender's network by compressing files during periods of high network traffic. The system also saves time for both the sender and the recipient of the e-mail communication, by compressing files to allow the e-mail communication to be transmitted as a single e-mail, and only compressing those files necessary to comply with the size or compressibility thresholds determined by the network. Additionally, the e-mail configuration module can be incorporated into a system and for configuring packages of attachments in e-mail communications. Once the package is defined, the e-mail configuration module compresses attachment files in the package such that the entire package can be sent as a single e-mail communication.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. An e-mail communications system for selectively compressing attachment files to an e-mail communication, comprising:
   (a) a table storing, for each of a plurality of different types of files, a compressibility value corresponding to a percentage by which the file type can typically be compressed in size; and
   (b) an e-mail attachment configuration module for selecting a minimum number of attachment files to be compressed in the e-mail communication so that a total size of the e-mail communication is at or under a threshold value by a minimized amount, the selection based upon compressibility values provided in the table, the e-mail attachment configuration module further configured to perform compression operations on the selected attachment files, wherein the compression operation performed by the e-mail attachment configuration module is done before the e-mail communication is sent.

2. The e-mail communications system according to claim 1, further comprising a network interface for transmitting the e-mail communication over a network after compression.

3. The e-mail communications system according to claim 2, wherein the threshold value is determined according to relative traffic capacity on the network.

4. The e-mail communications system according to claim 2, wherein the network includes a sender's network and a recipient's network.

5. The e-mail communications system according to claim 4, wherein the threshold value is determined according to the relative traffic capacity of the sender's network.

6. The e-mail communications system according to claim 1, wherein the threshold value is user-determined.

7. The e-mail communications system according to claim 1, wherein the threshold value is predetermined.

8. The e-mail communications system according to claim 7, wherein the threshold value is predetermined based upon the time of day that the e-mail communication is to be transmitted.

9. The system of claim 1, wherein the e-mail attachment configuration module uses different compression techniques according to the type of attachment file to be compressed.

10. An e-mail communications system for selectively compressing attachment files to an e-mail communication having a plurality of attachment files, comprising:
   (a) a table storing, for each of a plurality of different types of files, a compressibility value corresponding to a percentage by which the file type can typically be compressed in size, the table showing the compressibility value of the plurality of different types of files before a compression operation has been performed for a file belonging to one of the different types of files; and
   (b) an e-mail attachment configuration module for compressing a number of the plurality of attachment files according to file size and a corresponding compressibility value, such that the total size of the e-mail communication after compression is maximized and is less than a threshold size for determining which attachment files are sent in the e-mail communication, wherein the e-mail communications system is located on a computer device.

11. The e-mail communications system according to claim 10, wherein a minimum number of attachment files is compressed.

12. The e-mail communications system according to claim 10, further comprising a network interface for transmitting the e-mail communication along a network after compression.

13. The e-mail communications system according to claim 12, wherein the threshold size is determined according to relative traffic capacity on the network.

14. The e-mail communications system according to claim 12, wherein the network includes a sender's network and a recipient's network.

15. The e-mail communications system according to claim 14, wherein the threshold size is determined according to the relative traffic capacity of the sender's network.

16. The e-mail communications system according to claim 10, wherein the threshold size is user-determined.

17. The e-mail communications system according to claim 10, wherein the threshold size is predetermined.

18. The e-mail communications system according to claim 17, wherein the threshold size is predetermined based upon the time of day that the e-mail communication is to be transmitted.

19. An e-mail communications system for selectively compressing attachment files to an e-mail communication having a plurality of attachment files, comprising:
   (a) a user interface for assembling an e-mail communication having a plurality of attachments;
   (b) a compressibility table storing, for each of a plurality of different types of files, a compressibility value corresponding to the percentage by which the file type can be compressed in size, the compressibility table showing the compressibility value of the plurality of different types of files before a compression operation has been performed for a file belonging to one of the different types of files;
   (c) an e-mail attachment configuration module connected to the user interface and the compressibility table, for compressing a number of the plurality of attachment files designated in the user interface according to file size and a corresponding compressibility value in the compressibility table, such that the total size of the e-rail communication after compression is maximized and is less than a threshold size;
   (d) a memory for storing the compressed files; and
   (e) a network interface connected to the user interface for transmitting the e-mail communication after compression and for receiving the threshold size value, wherein the e-mail communications system is located on a computer device and the compression operation performed by the e-mail attachment configuration module is done before the e-mail communication is sent.

20. A method of selectively compressing attachment files to an e-mail communication for transmission via a network, comprising the steps of:
   (a) storing, for each of a plurality of different types of files, a compressibility value corresponding to a percentage by which the file type can be compressed in size, wherein the compressibility value is accessible before a compression operation has been performed for a file belonging to one of the different types of files;
   (b) determining a file type for each attachment file to the e-mail communication; and
   (c) selecting a minimum number of attachment files to be compressed in the e-mail communication so that a total size of the e-mail communication is at or under a threshold value by a minimized amount, the selection based upon the compressibility value of the attachment files;

(d) compressing selected attachment files.

21. The method of selectively compressing attachment files according to claim 20, wherein the threshold value is determined according to relative traffic capacity on the network.

22. The method of selectively compressing attachment files according to claim 20, wherein the network includes a sender's network and a recipient's network, and the threshold value is determined according to the relative traffic capacity of the sender's network.

23. The method of selectively compressing attachment files according to claim 20, wherein the threshold value is user-determined.

24. The method of selectively compressing attachment files according to claim 20, wherein the threshold value is predetermined based upon the time of day that the e-mail communication is to be transmitted.

25. The method of claim 20, wherein the compressing step utilizes different compression techniques according to the type of attachment file to be compressed.

26. A method of selectively compressing attachment files to an e-mail communication for transmission along a network, comprising the steps of:

(a) storing, for each of a plurality of different types of files, a compressibility value corresponding to a percentage by which the file type can typically be compressed in size, wherein the compressibility value is accessible before a compression operation has been performed for a file belonging to one of the different types of files;

(b) determining a file type for each attachment file to the e-mail communication; and (c) compressing a number of the plurality of attachment files according to file size and a corresponding compressibility value, such that the total size of the e-mail communication after compression is maximized and is less than a threshold size that is used as a basis for determining which attachment files are sent in the e-mail communication.

27. The method of selectively compressing attachment files according to claim 26, wherein a minimum number of attachment files is compressed.

28. The method of selectively compressing attachment files according to claim 26, wherein the threshold size is determined according to relative traffic capacity on the network.

29. The method of selectively compressing attachment files according to claim 26, wherein the threshold size is user-determined.

30. The method of selectively compressing attachment files according to claim 26, wherein the threshold size is pre-determined.

31. A method for configuring packages of e-mail attachment files for transmission as e-mail communications, comprising the steps of:

(a) creating a plurality of data structures, wherein each data structure groups together a plurality of different user application files designated as attachments to an e-mail communication;

(b) associating application files designated from within user applications to selected data structures, such that each designated application file is associated with a selected data structure;

(c) receiving a selection of a data structure for transmitting the application files associated with the data structure as attachments to an e-mail communication;

(d) storing, for each of a plurality of different types of files, a compression value corresponding to a percentage by which the file type can be compressed in size, wherein the compression value is accessible before a compression operation has been performed for a file belonging to one of the different types of files;

(e) determining a file type for each attachment file to the e-mail communication; and (f) compressing each attachment file of a type having a compression value greater than a threshold value in the email communication, wherein compression of each attachment is performed before the e-mail communication is sent and at least one different compression algorithm is used for at least one different file type.

32. The method of composing packages of e-mail attachment files according to claim 31, further comprising the step of associating each data structure created with a respective selected name identifying the data structure as a package of attachments.

33. The method of composing packages of e-mail attachment files according to claim 31, further comprising the step of associating each designated application file with a respective selected name identifying the application file as an attachment file.

34. The method of composing packages of e-mail attachment files according to claim 31, wherein a designation of an attachment file in the data structures is performed by linking to the respective user application file.

35. The method of composing packages of e-mail attachment files according to claim 31, wherein a designation of an attachment file in the data structures is performed by linking to a copy of the respective user application file made at the time of designation.

36. A method for configuring packages of e-mail attachment files for transmission as e-mail communications, comprising the steps of:

(a) creating a plurality of data structures, wherein each data structure groups together a plurality of different user application files designated as attachments to an e-mail communication;

(b) associating application files designated from within user applications to selected data structures, such that each designated application file is associated with a selected data structure;

(c) receiving a selection of a data structure for transmitting the application files associated with the data structure as attachments to an e-mail communication;

(d) storing, for each of a plurality of different types of files, a compressibility value corresponding to a percentage by which the file type can be compressed in size, wherein the compressibility value is accessible before a compression operation has been performed for a file belonging to one of the different types of files;

(e) determining a file type for each attachment file to the e-mail communication; and (f) compressing a number of the plurality of attachment files according to file size and corresponding compressibility value, such that the total size of the e-mail communication after compression is maximized and is less than a threshold size that is used as a basis for determining which attachment files are sent in the e-mail communication, wherein every possible combination of compressed and uncompressed attachment files are devised before a maximum total size is determined that is less than a threshold size.

37. A system for configuring packages of e-mail attachment files for transmission as e-mail communications, comprising:
(a) a plurality of data structures, each data structure grouping together a plurality of different user application files designated as attachments to an e-mail communication;
(b) a packaging file manager for designating user application files from within respective user applications to selected data structures, such that each designated application file is associated with a selected data structure;
(c) an email application user interface providing a listing of the data structures containing user application files generated by the packaging file manager during composition of an e-mail communication having attachments;
(d) a table storing, for each of a plurality of different types of files, a value corresponding to a percentage by which the file type can be compressed in size, the table capable of being accessed prior to a compression operation being performed for a file belonging to one of the different types of files; and
(e) an e-mail attachment configuration module for compressing each attachment file in a selected data structure of a type having a compressibility value greater than a threshold value in an e-mail communication, wherein the system is located on a computer device and the compression operation performed by the e-mail attachment configuration module is done before the e-mail communication is sent to a recipient, a different compression algorithm being utilized for different file types.

38. A system for configuring packages of e-mail attachment files for transmission as e-mail communications, comprising:
(a) a plurality of data structures, each data structure grouping together a plurality of different user application files designated as attachments to an e-mail communication;
(b) a packaging file manager for designating user application files from within respective user applications to selected data structures, such that each designated application file is associated with a selected data structure;
(c) an e-mail application user interface providing a listing of the data structures containing user application files generated by the packaging file manager during composition of an e-mail communication having attachments;
(d) a table storing, for each of a plurality of different types of files, a value corresponding to a percentage by which the file can typically be compressed in size, the table capable of being accessed prior to a compression operation being performed for a file belonging to one of the different types of files; and
(e) an e-mail attachment configuration module for compressing a number of the plurality of attachment files of a selected data structure according to file size and a corresponding compressibility value, such that the total size of the e-mail communication after compression is maximized and is less than a threshold size, wherein the system is located on a computer device and the compression operation performed by the e-mail attachment configuration module is done before the e-mail communication is sent to a recipient.

39. A method of configuring an e-mail communication comprising a plurality of attachment files for transmission along a network, comprising the steps of:
(a) determining a compressibility value for each attachment file in the e-mail communication;
(b) determining which of the plurality of attachment files to compress based upon at least the compressibility value for each attachment file, wherein every possible combination of compressed and uncompressed attachment files are devised before a maximum total size is determined for the e-mail communication that is less than a threshold size;
(c) compressing the attachment files designated for compression before transmission of the e-mail communication; and
(d) transmitting the e-mail communication.

40. The method of configuring an e-mail communication according to claim 39, wherein the steps of determining a compressibility value, determining which files to compress, and compressing the attachment files designated for compression is performed in an e-mail server.

41. The method of configuring an e-mail communication according to claim 39, further comprising the step of providing an internet link to an Internet website for downloading software to be able to decompress attachment files.

42. The method of claim 39, wherein the compressing step utilizes different compression techniques according to a type of attachment file to be compressed.

43. A method for configuring transmission along a network of a plurality of attachment files in an e-mail communication, comprising the steps of:
(a) determining a compressibility value for each attachment file in the e-mail communication;
(b) before transmission of the e-mail communication to a recipient, determining which of the plurality of attachment files to compress based upon at least the compressibility value for each attachment file;
(c) before transmission of the email communication, compressing the attachment files designated for compression; and
(d) transmitting the attachment files as a plurality of e-mail communications divided such that each e-mail communication is within an acceptable size limit, wherein every possible combination of compressed and uncompressed attachment files are devised before a minimum number of email communications are determined to be within the acceptable size limit.

44. The method for configuring transmission of a plurality of attachment files according to claim 43, wherein the attachment files are divided into a minimum number of e-mail communications required that are each under the acceptable size limit.

* * * * *